SEARCH ROOM
OR 3,126,513
24 N
X 5397 W
E/C

March 24, 1964 I. KAMEN 3,126,513
AUDIENCE SURVEY INTERROGATING SYSTEM FOR
A PLURALITY OF TELEVISION RECEIVERS
Filed Dec. 21, 1961 3 Sheets-Sheet 1

INVENTOR.
IRA KAMEN
BY
Michael S. Striker
Attorney

March 24, 1964 I. KAMEN 3,126,513

AUDIENCE SURVEY INTERROGATING SYSTEM FOR A PLURALITY OF TELEVISION RECEIVERS

Filed Dec. 21, 1961 3 Sheets-Sheet 2

INVENTOR.
IRA KAMEN

BY

Michael S. Striker
Attorney

INVENTOR.
IRA KAMEN
BY
Michael S. Striker
Attorney

United States Patent Office 3,126,513
Patented Mar. 24, 1964

3,126,513

AUDIENCE SURVEY INTERROGATING SYSTEM FOR A PLURALITY OF TELEVISION RECEIVERS

Ira Kamen, New York, N.Y., assignor to Teleglobe Pay-TV-System, Inc., New York, N.Y.

Filed Dec. 21, 1961, Ser. No. 161,197
6 Claims. (Cl. 325—31)

The present invention relates to an interrogating system for interrogating communication system receivers. More particularly, the invention relates to an interrogating system for interrogating television or radio receivers.

This application is a continuation-in-part of my copending application (now abandoned) Serial No. 124,665, filed July 17, 1961.

Throughout the specification the term "interrogate" and its derivatives are utilized to indicate the determination of the receiving condition of a selected number of television receivers. That is, by interrogating a selected number of receivers, the system operates to determine what intelligence band or signal or channel each of the selected receivers is tuned to, if the receivers are in operation, and indicates when the receivers are not in operation as well as the date and the time of the interrogation for sampling of the selected receivers.

At the present time, when it is desired to "rate" a television program, either of two systems is utilized to interrogate the television receivers selected for the rating operation. Each of these presently utilized systems has substantial limitations inherent in it. A presently used system of interrogation is the installation of a recording device at the receiver itself. This device is wired to the tuner of the television receiver in such a manner that information as to the channel being reproduced by the receiver is recorded on a tape. The tapes of selected receivers are then periodically collected for interpretation and evaluation. This system thus entials the difficulties of necessitating special wiring to each of the receivers with which it is utilized and the expense of collecting the tapes periodically and evaluating them. Aside from these difficulties, the interrogation or sampling is not adaptable to facility in changing the selected receivers. That is, each time a receiver is to be interrogated, the recording device must be connected to the tuner of the selected receiver. It is thus expensive to change the sampling group or selected receivers to be interrogated.

The other presently used system of interrogation is the personal contact type which entails calling a selected number of viewers at selected times and asking them what programs or channels they are viewing. This system is replete with inaccuracy and inadequacy and is susceptible to gross misrepresentation. A televisioin viewer may be viewing one channel at one moment and switch to another channel the moment after. The viewer may watch the entertainment portion of the program and switch the channel before or during the commercial portion of the program. A viewer may be annoyed at the interviewer and may misrepresent his viewing activities. The gross inadequacy of the system lies in its limited accessibility to television viewers due to the necessary limitations involved where each viewer is questioned directly by telephone.

The principal object of the present invention is to provide a new and improved interrogating system for interrogating the receivers of a communication system, such as, for example, a television or radio communication system.

An object of the present invention is to provide a communication system interrogating system of great efficiency and very simple structure.

Another object of the present invention is to provide a communication system interrogation system of complete accuracy and reliability in operation.

Another object of the present invention is to provide a communication system interrogation system which is readily and facilely installed and removed.

Another object of the present invention is to provide a communication system interrogation system adapted to interrogate an unlimited number of receivers of the communication system.

Another object of the present invention is to provide a communication system interrogation system adapted to advise a viewer or listener that his opinion of a program viewed or heard is solicited.

Another object of the present invention is to provide a communication system interrogation system in which a solicited viewer or listener may facilely and conveniently convey his opinion of a program viewed or heard.

Another object of the present invention is to provide a communication system interrogation system in which a solocited viewer or listener may facilely and conveniently convey his opinion of a program viewed or heard as Excellent, Good, Fair or Poor.

Another object of the present invention is to provide a communication system interrogation system which is wholly automatic in operation in indicating the solocited viewers or listeners opinions of programs viewed or heard.

Still another object of the present invention is to provide a communication system interrogation system which is wholly automatic in operation and which provides complete rating or sampling information.

In accordance with the present invention, an interrogating system for interrogating selected ones of a plurality of communication or television system receivers utilizes the spurious signals radiated by such receivers during the course of their normal operation. That is, since each different intelligence band or channel has its own frequency as distinguished from the others, it causes the production of its own spurious signal which has its own characteristic frequency as distinguished from the other spurious signal frequencies. Thus, the interrogating system of the present invention identifies the frequency of the spurious signal radiated by each of the selected receivers thereby identifying the frequency of the intelligence band or channel received and reproduced by each of the selected receivers.

Furthermore, in accordance with the present invention, an interrogating system for interrogating selected ones of a plurality of communication or television system receivers utilizes a line switching unit for a pair of electrically conductive wires, comprising four switching branches connected between the pair of electrically conductive wires and a point at ground potential and each being adapted to provide a conductive path to ground which is electrically distinguishable from the conductive path to ground provided by the others of the switching branches.

The method of the present invention comprises the steps of receiving the spurious signals radiated by selected receivers of a communication system, identifying the frequency of the spurious signal radiated by each of the selected receivers and determining the frequency of the spurious signal received from each of the selected receivers thereby determining the frequency of the intelligence band received and reproduced by each of the selected ones of the receivers.

In order that the present invention may be readily carried into effect, it will now be described with reference to the accompanying drawings, wherein.

Figure 1:
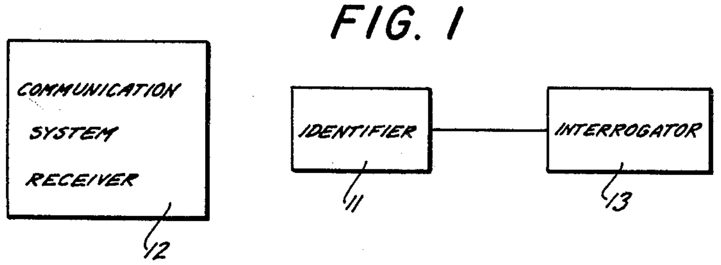
FIG. 1 is a schematic block diagram of an embodiment of the essential components of the interrogating system of the present invention.

The receiver of a communication system, such as, for example, a radio or television system, in receiving and reproducing intelligence functions to select one of a plurality of communication bands under the tuning control instituted manually by the listener or viewer. The radio or television receiver includes an internal source of oscillations which is utilized to beat with the incoming intelligence band signals in order to select and reproduce the desired intelligence band signal. Thus, for example, in a television system the internal oscillator must oscillate at, for example, 100 megacycles per second in order to beat with the RF input frequency of 60 megacycles per second to produce an IF frequency of 40 megacycles per second. For each channel received and reproduced by the television receiver under the manual tuning control of the viewer the frequency of oscillations produced by the internal oscillator varies, so that the frequency of oscillations is different for each channel. This is, of course, the case with a radio receiver as well.

When the internal oscillator of the radio or television receiver functions in its usual manner, it radiates spurious signals which are undesirable and are not utilized in the normal receiver operation. As a matter of fact, the spurious signals are a source of interference with accurate reproduction of the received transmitted intelligence bands and various methods are utilized in an attempt to eliminate or reduce said spurious signals. The spurious signals are radiated in an area around the receiver and are thus present in some instances up to 20 feet away from a television receiver. The television receiver oscillator tube assembly is shielded in order to minimize the radiation of spurious signals as much as is possible from a practical point of view. However, from a practical point of view, heat dissipation in the tuner area is a more critical problem and the tube assembly and associated circuits are not completely screened in order to permit heat dissipation therefrom. Aside from this, the spurious signals find their way into the 300 ohm line running to the antenna input of the receiver and are radiated therefrom.

Since the spurious signals are radiated from the oscillator of the receiver, and since the frequency of the oscillations of said oscillator varies with each intelligence band or channel received and reproduced by said receiver, the frequency of the spurious signals varies in accordance with the frequency of oscillations produced by the said oscillator. Thus, the frequency of the spurious signal reproduced by the receiver is directly dependent upon and corresponds to the frequency of oscillations of the internal oscillator of the receiver which in turn is directly dependent upon and corresponds to the intelligence band or channel to which said receiver is tuned and which is reproduced by the said receiver, so that the frequency of the spurious signal corresponds to the intelligence band or channel reproduced by the receiver.

The principal feature of the present invention is that it utilizes these undesired, unused, unwanted and disdained spurious signals to good advantage in indicating the intelligence band or channel reproduced by the receiver at the time of interrogation. This eliminates the need for wiring connections to the receiver, phone calls to the viewer, or any interference with the normal operation of the receiver, and provides a fully automatic interrogating system of unlimited selective scope as well as great accuracy and reliability in operation in indicating the exact date, time and intelligence band to which each of the identified selected radio or television receivers is tuned and which is reproduced by said selected receivers.

The essential ingredients or components of the interrogating system of the present invention, as illustrated in FIG. 1, comprise an identifier 11 positioned in operative proximity with the receiver 12 of a communication system and an interrogator 13 coupled to the identifier 11. The receiver 12 may comprise any suitable communication system receiver, such as, for example, a radio receiver or a television receiver, although, for the purpose of clarity in illustration it will be assumed throughout the specification that the communication system is a television system and the receiver is thus a television receiver. The identifier 11 is positioned within the field of radiation of the spurious signals of the receiver 12 in order to permit it to receive such spurious signals and functions to identify the spurious signal radiated by the receiver at any instant determined by the interrogator 13; the interrogator functioning to determine the frequency of the spurious signal received by the identifier thereby determining the frequency of the intelligence band or signal received and reproduced by the receiver at that instant.

Figure 4:
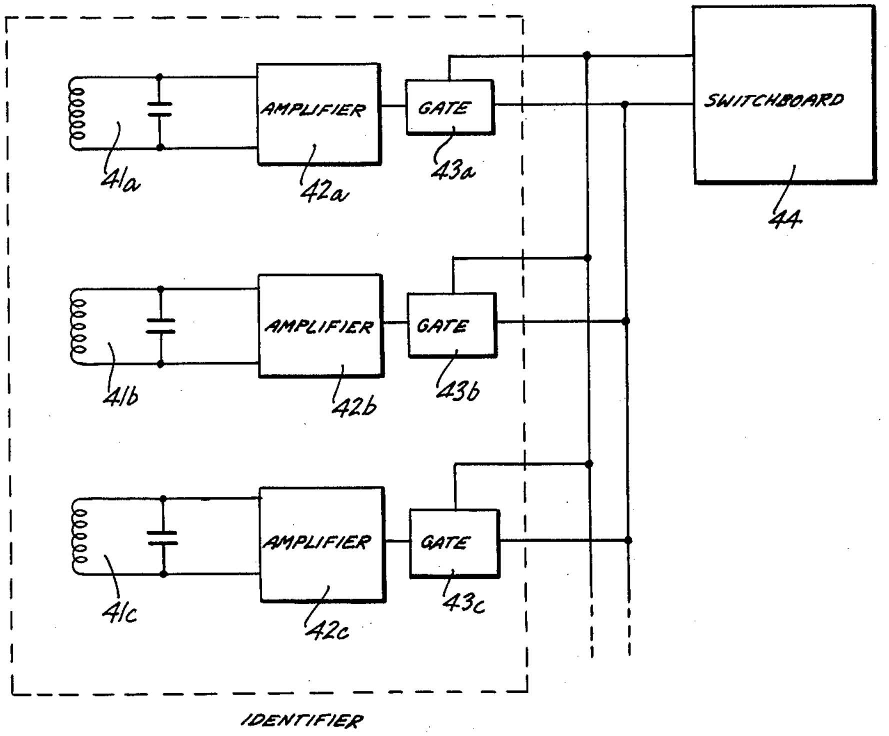
FIG. 4 is a schematic circuit diagram of another embodiment of the identifier portion of the embodiment of FIG. 2.

The identifier 11 may thus comprise any suitable known means for identifying a frequency received and the interrogator 13 may comprise any suitable known means for determining the frequency identified by the identifier. Suitable embodiments of circuit arrangements which may be utilized as the identifier 11 are shown in FIGS. 3 and 4 and are described in connection with such figures.

Figures 2, 3:
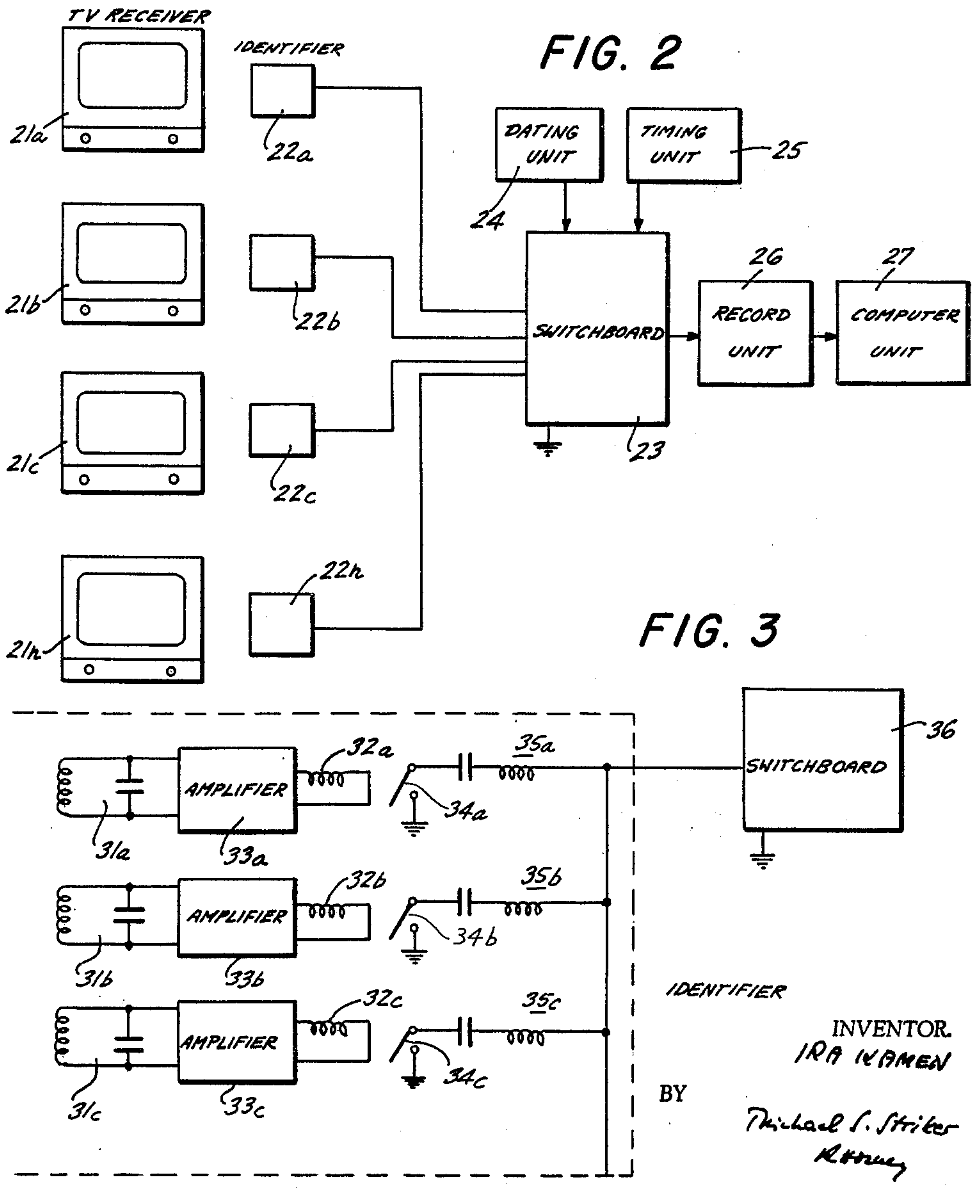
FIG. 2 is a schematic block diagram of an embodiment of the interrogating system of the present invention for interrogating television receivers.
FIG. 3 is a schematic circuit diagram of an embodiment of the identifier portion of the embodiment of FIG. 2.

FIG. 2 is a schematic block diagram of an embodiment of the interrogating system of the present invention for interrogating selected receivers of a communication system, such as, for example, television receivers. A selected number of television receivers **21*a*, 21*b*, 21*c*, 21*n* is to be interrogated. That is, it is desired to determine what channels the viewers of the selected receivers 21*a–n* are viewing at selected times. An identifier 22*a* associated with the receiver 21*a* is positioned in operative proximity with said receiver. An identifier 22*b* associated with the receiver 21*b* is positioned in operative proximity with said receiver. An identifier 22*c* associated with the receiver 21*c* is positioned in operative proximity with said receiver. An identifier 22*n* associated with the receiver 21*n* is positioned in operative proximity with said receiver. The receiver 21*n*** is so labeled as to indicate that any number "*n*" of receivers may be selected for interrogation.

Each of the identifiers **22*a–n* is connected by a suitable line, such as, for example, a telephone line to a switchboard 23 which may comprise any suitable known manually operated or automatic switchboard. A suitable atuomatic switchboard which may be utilized is that manufactured by the General Telephone Company. The switchboard 23 selects the receivers to be interrogated and then functions as an interrogator by sending interrogation signals to the selected receivers. The interrogation signals are received by the identifiers 22*a–n* and are returned as ringing signals in the manner of well known telephone system operation to the switchboard 23. Since only that spurious frequency indicative of the channel received and reproduced by each receiver 21*a–n* is received and identified by its assocaited identifier 22*a–n*,** respectively, the signal returned to the switchboard 23 corresponds to the channel being viewed at the time of the interrogation. The switchboard 23 by utilizing a suitable known dating unit 24 and a suitable known timing unit 25 may thus provide an indication of the date of the interrogation, the time of the interrogation, the receiver interrogated and the channel received and reproduced by the interrogated receiver on said date at said time. The switchboard 23 may thus be connected to a record unit 26 which is adapted to record the indications provided by said switchboard in any suitable known manner. Thus, for example, the record unit 26 may provide a code-perforated tape indicating date, time, receiver identification number and channel identification number or it may provide a similar record on a magnetizable recording medium. If it is desired to produce a readable translation of the information indicated by the switchboard 23, a computer unit 27 may be connected to the record unit 26 and may function in any suitable known manner to translate the information recorded by said record unit into the actual printed date, time, receiver identification number and channel identification number.

Although the identifier 11 may comprise any suitable known means for receiving the spurious signals radiated by the receivers and for identifying the frequency of the spurious signal radiated by the receiver at the time of interrogation, two suitable embodiments of identifiers are disclosed in order to enhance the clarity of illustration. FIG. 3 discloses what may be called an electromechanical identifier arrangement and FIG. 4 discloses what may be called an electronic identifier arrangement.

In FIG. 3, the identifier comprises a plurality of RF resonant circuits 31*a*, 31*b*, 31*c*, etc., of a number equal to the number of channels transmitted in the communication system of which the associated receiver is a part. Each of the RF resonant or tank circuits is adapted to resonate at a frequency corresponding to a different spurious signal frequency. That is, if the selected receiver is, for example, in an area where three channels are transmitted and may be reproduced by said receiver, if the first channel is reproduced by the receiver, the spurious signal radiated by the oscillations produced by the internal oscillator has a first frequency corresponding to, but not equal to, the frequency of the first channel and the RF resonant circuit 31*a* is tuned to such spurious signal frequency so that it resonates thereat. If the second channel is reproduced by the receiver, the spurious signal radiated by the oscillations produced by the internal oscillator has a second frequency, different from the first frequency, corresponding to the frequency of the second channel and the RF resonant circuit 31*b* is tuned to such second spurious signal frequency so that it resonates thereat. If the third channel is reproduced by the receiver, the spurious signal radiated by the oscillations produced by the internal oscillator has a third frequency, different from the first and second frequencies, corresponding to the frequency of the third channel and the RF resonant circuit 31*c* is tuned to such third spurious signal frequency so that it resonates thereat.

Each of the RF resonant circuits 31*a–c* is connected to an associated relay energizing winding 32*a*, 32*b* and 32*c*, respectively, through an associated amplification stage 33*a*, 33*b* and 33*c*, respectively, so that any one of the RF resonant circuits which is in resonating condition functions to energize its associated relay energizing winding. Thus, when an RF resonant circuit 31*a–c* is resonated due to a received corresponding spurious signal of a frequency indicating the reproduction of a corresponding channel by the selected receiver, it energizes its associated relay energizing winding to close a corresponding relay armature 34*a*, 34*b* or 34*c*.

An indicator or ringing circuit 35*a*, 35*b* and 35*c*, respectively, is associated with each of the relays and its associated RF resonant circuit. Tht is, an indicator or ringing circuit of any suitable known type, such as, for example, an AF resonant circuit 35*a–c* is associated with each of the RF resonant circuit 31*a–c*. Each of the ringing or AF resonant circuits is connected at one end to a point at ground potential through its corresponding relay armature 34*a–c* and is connected at its other end through a suitable lead, such as, for example, a telephone line, to a switchboard 36 which is similar to the switchboard 23 of the embodiment of FIG. 2. Each of the ringing circuits is connected at its switchboard connected end to the others. Since only one channel may be reproduced by the receiver at any instant, only one RF resonant circuit 31*a–c* corresponding to the reproduced chanel is resonating at that instant to close its associated relay armature 34*a–c* to activate or close the ringing or AF resonant circuit associated therewith. Thus, at any instant, if the receiver is reproducing a channel, the ringing circuit 35*a–c* associated with the RF resonant circuit corresponding to said channel is activated, or connected in circuit with or through the switchboard 36. If the switchboard 36, which is connected to any number of identical identifier units, then directs an interrogation signal to an identifier, each of the ringing circuits of the interrogated identifier, will receive the interrogation signal, but only that one of said ringing circuits which is activated or in closed circuit condition will return the interrogation signal or a ringing signal to said switchboard. This permits the switchboard 36 to receive an indication of which channel is being reproduced by the selected receiver at the selected time instant. Since the switchboard 36 provides connections to all the identifier units in its area, each identifier is readily identified by an identification number so that the complete data of date, time, receiver and chanel reproduced is available at said switchboard.

The RF resonant circuits 31*a–c* resonate at RF frequencies, each of said circuits being adapted to resonate at a frequency different from the others and corresponding to the frequency of the spurious signal radiated when its associated channel is reproduced. The RF resonant circuits 31*a–c* may thus resonate at, for example, 100, 106 and 110 megacycles per second, respectively. The AF resonant circuits 35*a–c* resonate at AF frequencies, each of said circuits being adapted to resonate at a frequency different from the others and corresponding to the frequency of its associated RF resonant circuit so that each channel is represented by its associated AF resonant circuit. The AF resonant circuits 35*a–c* may thus resonate, at, for example, 400, 500 and 600 cycles per second, respectively. If a radio receiver instead of a television receiver is interrogated the frequencies involved will be substantially lower.

The telephone lines utilized to connect the identifier units with the switchboard may be utilized with individual loudspeakers located in the homes of the viewers of the selected receivers to provide music during times when the interrogation system is not in operation. Of course, if the viewer of the selected receiver is a subscriber to a subscription television system utilizing a telephone line, the line utilized may also be used for the interrogation system of the present invention.

In FIG. 4, the identifier comprises a plurality of RF resonant circuits 41*a*, 41*b* and 41*c*, etc. of a number equal to the number of channels transmitted in the communication system of which the associated receiver is a part. As in the embodiment of FIG. 3, each of the RF resonant or tank circuits is adapted to resonate at a frequency corresponding to a different spurious signal frequency and each is connected to an associated amplification stage 42*a*, 42*b* and 42*c*, respectively.

Each of the RF resonant circuits 41*a–c* is connected through its associated amplification stage 42*a–c*, respectively, to an associated gate 43*a*, 43*b* and 43*c*, respectively. Thus, when an RF resonant circuit 41*a–c* is resonating due to a received corresponding spurious signal of a frequency indicating the reproduction of the corresponding channel by the selected receiver, it activates its associated gate 43*a*, 43*b* or 43*c*.

Each gate 43*a–c* may comprise any suitable known gate, such as, for example, an AND gate of well known type having two inputs and an output and adapted to maintain one of an open or a conductive condition in which a signal received at the first input is conducted to the output when a signal is received simultaneously at the second input and a closed or non-conductive condition in which no signal is available at its output when a signal is received at only one of its inputs or at neither of its inputs. The first input, since it provides the signal which is conducted through or blocked by the gate, may be distinguished from the second input by describing the second input as conduction control means, since the presence of a signal at the conduction control means at the same time that a signal is present at the first input is the prerequisite for maintaining the gate in its open or conductive condition.

Each of the gates 43*a–c* has one of its first and second inputs connected to its associated amplification stage 42*a–c*, respectively, and the other of its inputs connected to a switchboard 44 through a suitable lead, such as for example, a telephone line. The switchboard 44 is similar to the switchboard 23 of the embodiment of FIG. 2, and in a preferred embodiment of the invention the first input is connected to the switchboard 44 and the conduction control means is connected to the amplifier associated with the gate. The output of each of the gates 43*a–c* is connected to the switchboard 44 through a suitable lead, such as, for example, a telephone line. The first input of each of the gates is connected to the first input of the others of the gates and the output of each of the gates is connected to the outputs of the others of the gates. Since only one channel may be reproduced by the receiver at any instant, only one RF resonant circuit 31*a–c* corresponding to the reproduced channel resonates at that instant to activate the gate associated therewith. Thus, at any instant, if the receiver is reproducing a channel, the gate 43*a–c* associated with the RF resonant circuit corresponding to said channel is activated or connected in circuit with or through the switchboard 44. If the switchboard 44, which is connected to any number of identical identifier units, then directs an interrogation signal to an identifier unit each of the gates of the interrogated identifier unit will receive the interrogation signal, but only that one of said gates which is activated or in closed circuit condition will return the interrogation signal to the switchboard. This permits the availability at the switchboard 44 of the complete data of date, time, receiver and channel reproduced.

The interrogation system of the present invention is especially adapted for use in educational television programming in that it may be utilized to monitor attendance and response as frequently as desired. That is, the system of the present invention may be utilized to indicate whether the students taking the course have their receivers tuned to the channel on which the course is televised at the time that the course is being televised. There is, of course, no guarantee that because the receiver is tuned to and is reproducing the educational program the student is necessarily viewing the program, or even if he is viewing the program, whether he is devoting his attention thereto. In order to assure the attention of the student to the televised program, as well as to permit frequent examination of the student, an auxiliary system, an embodiment of which is shown in FIG. 5, may be utilized with the interrogation system of the present invention.

Figure 5:
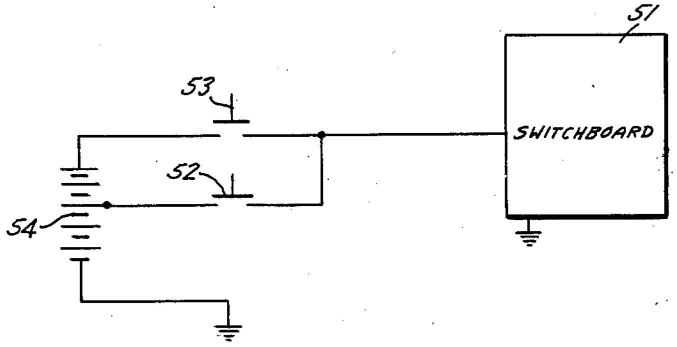
FIG. 5 is a circuit diagram of an embodiment of an auxiliary system which may be utilized with the interrogating system of the present invention.

Any number of auxiliary systems identical, to that of FIG. 5 is connected to a switchboard 51, similar to the switchboard 23 of the embodiment of FIG. 2. The viewer may depress or close a first switch 52 to transmit a relatively low voltage signal to the switchboard 51 thereby indicating an answer "no" or "false" to a question put to him during the course of the educational program and may depress or close a second switch 53 to transmit a relatively large voltage signal to the switchboard 51 thereby indicating an answer "yes" or "true" to said question. The timing unit 25 (shown in FIG. 2), by marking the time of receipt of the signal from the auxiliary system, thus provides a record of which question is answered as well as the answer. Obviously, any suitable system for signalling yes or no may be utilized, such as, for example, a system which transmits a zero voltage and a voltage signal, a system which transmits a positive voltage and a negative voltage signal, a system which transmits a first frequency signal and a second frequency signal, etc. Thus, although the signalling voltages shown in the embodiment of FIG. 5 are derived from a single D.C. source 54, two different sources may be utilized, or indeed, if multiple choice questions are to be answered, a plurality of different frequency sources, or other suitable similar means, may be utilized for answering back to the switchboard 51.

Figure 6:
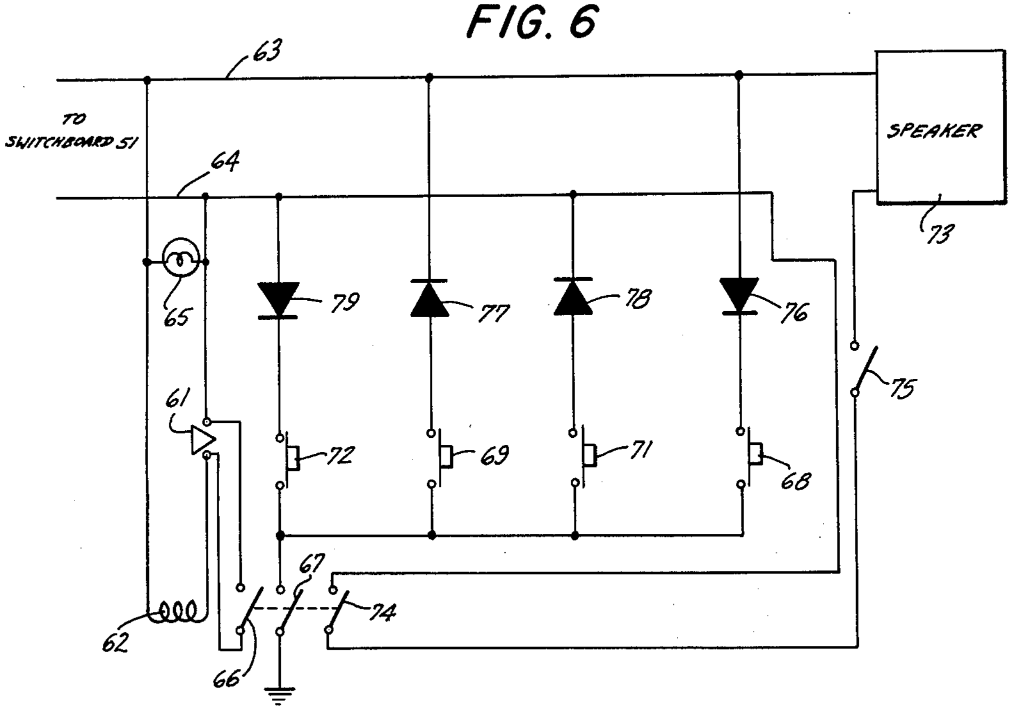
FIG. 6 is a schematic circuit diagram of an embodiment of the opinion response line switching unit of the interrogating system of the present invention.

FIG. 6 is an embodiment of the opinion response line switching unit of the interrogating system of the present invention. The line switching unit comprises a switching arrangement connected to a Tip, Ring and Ground telephone circuit connected to the switchboard 51 and provided in the near vicinity of each television or radio receiver.

A manually operated short contact switch 61 is connected in series circuit arrangement with a relay winding 62 between the Tip line 63 and the Ring line 64 of the telephone circuit. The telephone circuit is connected to the switchboard 51 so that said switchboard energizes the telephone lines leading to the receivers of viewers whose opinions of the programs they are watching is to be solicited.

Upon energization of the Tip and Ring lines at the receiver of the solicited viewer, a signal lamp 65 connected between said Tip and Ring lines is energized and indicates to the viewer that his opinion of the program he is viewing is solicited. If the viewer then depresses the short contact switch 61 the series circuit arrangement of said short contact switch and the relay winding 62 is closed and said relay winding is energized.

A hold switch 66 is connected in shunt across the short contact switch 61 and is controlled in operation by the relay winding 62. A ground switch 67 is interposed between four manually operated switches 68, 69, 71 and 72 and a point at ground potential and is controlled in operation by the relay winding 62. The ground switch 67 is adapted to selectively open and close the connection of the pair of telephone lines to ground. Thus, when the relay winding 62 is energized it closes the hold switch 66 to maintain its energized condition and closes the ground switch 67 to connect each of the switches 68, 69, 71 and 72 to ground.

A speaker 73 is connected between the pair of telephone wires 63 and 64 and broadcasts intelligence originating from an opinion soliciting source and transmitted via the switchboard 51 and said telephone wires to the viewers whose opinions of programs being viewed are solicited. Thus, the opinion soliciting source may advise the viewer via his speaker 73 that on the channel which he is presently viewing is a program which he is requested to watch and submit his opinion on.

A speaker switch circuit 74 is interposed between the pair of telephone lines and the speaker 73 and is adapted to open and close the connection of said speaker to said lines so that the viewer may connect and disconnect his speaker as he wishes. The speaker switch 74 may be positioned in any manner suitable to enable energization and deenergization of the speaker 73 by the viewer.

The speaker off-on switch 75 allows the subscriber to disconnect himself from the test network by simply turning his speaker switch to the off position.

When the ground switch 67 is closed, the closing of the manually operated switches 68, 69, 71 and 72 closed the Tip or Ring line to ground; only one of these switches being closed at a time. That is, only one of the switches 68, 69, 71 and 72 may be closed at a time. This is achieved by any suitable means known in the art, such as, for example, an arrangement commonly utilized in push-button radios to insure that only one station selecting button or switch is depressed at a time. Thus, the Tip and Ring lines are connected in series parallel arrangement to ground. The Tip line and the Ring line of the Tip and Ring circuit each has two manually operated switches connected thereto.

A first diode 76 is connected in a positive conducting direction relative to ground from the Tip lines 63 to the switch 68. A second diode 77 is connected in a negative conducting direction relative to ground from the Tip line 63 to the switch 69. Thus, a single line of the telephone circuit, which may be either the Tip or the Ring line, will be grounded by the appropriate switch 68 or 69. The Tip and the Ring line will therefore each indicate either of two different signals.

A third diode 78 is connected between the Ring line 64 and the associated manually operated switch 71 in a negative conducting direction relative to ground and a fourth diode 79 is connected between the Ring line and the manually operated switch 72 in a positive conducting direction relative to ground. Thus, upon the closing of either of the switches 68 and 69 the Tip line will be closed to ground through the ground switch 67 and the diodes 76 and 77 will insure the transmission of a positive and negative, signal, respectively, through the line. Upon the closing of either of the switches 71 and 72 the Ring line will be closed to ground through the ground switch 67 and the diodes 78 and 79 will insure the transmission of a negative and positive signal, respectively, through the line.

Thus, if the viewer's opinion is solicited by energization of his telephone lines 63 and 64 and/or by a request transmitted via the speaker 73 and if the viewer is agreeable to submitting his opinion and according depresses the short contact switch 61, the operation response line switching unit will be ready, as soon as the ground switch 67 is closed, to transmit the viewer's opinion back to the switchboard 51 wherefrom such opinion may be suitably recorded or channeled to a desired point.

If the viewer likes the program very much and finds it outstanding he may wish to indicate his opinion that the program is excellent. He may then depress or close the switch 72, thereby providing a positive signal relative to ground in the Ring line, which signal may have been preselected to indicate at the switchboard 51 an Excellent rating.

If the viewer wishes to indicate his opinion that the program is enjoyable, but not excellent, he may depress or close the switch 69, thereby providing a negative signal relative to ground in the Tip line, which signal may have been preselected to indicate at the switchboard 51 a Good rating.

If the viewer wishes to indicate his opinion that the program is tolerable, but not good, he may depress or close the switch 71, thereby providing a negative signal relative to ground in the Ring line, which signal may have been preselected to indicate at the switchboard 51 a Fair rating.

If the viewer wishes to indicate his opinion that the program is bad, he may depress or close the switch 68, thereby providing a positive signal relative to ground in the Tip line, which signal may have been preselected to indicate at the switchboard 51 a Poor rating.

The utilization of the four diodes in the line switching unit permits great economy in operation and permits the evaluation of the occurrence of four functions, that is, four different opinions or intelligence levels, by the utilization of but a single pair of Tip and Ring telephone lines to identify four different signals.

Figure 7:
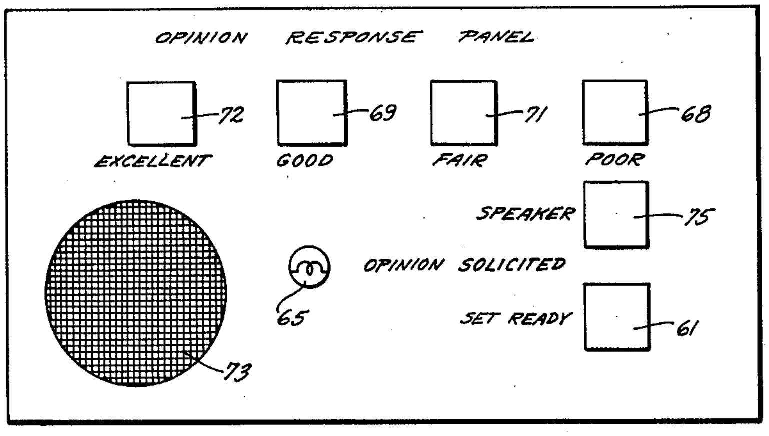
FIG. 7 is a front view of an embodiment of an opinion response panel which may be utilized to house the opinion response line switching unit of the interrogating system of the present invention.

FIG. 7 is an embodiment of a panel which may provide a compact and handy housing for the opinion response line switching unit of the interrogating system of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. An interrogating system for interrogating selected ones of a plurality of television receivers each adapted to receive and reproduce a plurality of different channels, each of said channels having a frequency different from the others of said channels, each of said receivers radiating a plurality of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximity with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of said indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel received and reproduced by each of the receivers proximate to said selected ones of said identifying means; switchboard means connected to said indicating circuits for selecting and permitting energization of determined ones of said identifying means and for indicating each of the receivers proximate to said selected ones of said identifying means and the channel received and reproduced by each of said last-mentioned receivers; electrically conductive wire means connected from said switchboard means to the proximity of each of said receivers; and a line switching unit for each of said plurality of receivers, each said line switching unit comprising a plurality of switching branches connected between said conductive wire means and a point at ground potential and each being adapted to provide a conductive path to ground which is electrically distinguishable from the conductive path to ground provided by the others of said switching branches.

2. An interrogating system for interrogating selected ones of a plurality of television receivers each adapted to receive and reproduce a plurality of different channels, each of said channels having a frequency different from the others of said channels, each of said receivers radiating a plurality of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximity with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of said indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel received and reproduced by each of the receivers proximate to said selected ones of said identifying means; switchboard means connected to said indicating circuits for selecting and permitting energization of determined ones of said identifying means and for indicating each of the receivers proximate to said selected ones of said identifying means and the channel received and reproduced by each of said last-mentioned receivers; electrically conductive wires connected from said switchboard means to the proximity of each of said receivers; and a line switching unit for each of said plurality of receivers, each said line switching unit comprising a plurality of switching branches connected between said conductive wire means and a point at ground potential and each including switch means adapted to selectively open and close the connection of the switching branch in which it is connected to ground and a diode connected to said switch means in a predetermined direction of conductivity, ground switch means interposed between said switching branches and said point at ground potential and adapted to selectively open and close the connection of said switching branches to ground, and ground switch control means connected to said electrically conductive wire means and adapted to control the operation of said ground switch means by a signal in the said electrically conductive wire means.

3. An interrogating system for interrogating selected ones of a plurality of television recievers each adapted to receive and reproduce a plurality of different channels, each of said channels having a frequency different from the others of said channels, each of said receivers radiating a plurlity of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximitiy with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of sad indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel recieved and reproduced by each of the receivers proximate to said selected ones of said identifying means; switchboard means connected to said indicating circuits for selcting and permitting energization of determined ones of said identifying means and for indicating each of the receivers proximate to said selected ones of said identifying means and the channel received and reproduced by each of said last-mentioned receivers; electrically conductive wire means connected from said switchboard means to the proximity of each of said receivers; and a line switching unit for each of said plurality of receivers, each said line switching unit comprising four switching branches connected between said pair of electrically conductive wires and a point at ground potential and each including switch means adapted to selectively open and close the connection of the switching branch in which it is connected to ground and a diode connected to said switch means in a predetermined direction of conductivity relative to ground.

4. An interrogating system for interrogating selected ones of a plurality of television recivers each adapted to receive and reproduces a plurality of different channels, each of said channels having a frequency different from the others of said channels, each of said receivers radiating a plurality of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximity with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of said indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel received and reproduced by each of the receivers proximate to said selected ones of said identifying means; switchboard means connected to said indicating circuits for selecting and permitting energization of determined ones of said identifying means and for indicating each of the receivers proximate to said selected ones of said identifying means and the channel received and reproduced by each of said last-mentioned receivers; electrically conductive wire means connected from said switchboard means to the proximity of each of said receivers; and a line switching unit for each of said plurality of receivers, each said line switching unit comprising four switching branches connected between said pair of conductive wire means and a point at ground potential and each including switch means adapted to selectively open and close the connection of the switching branch in which it is connected to ground and a diode connected to said switch means in a predetermined direction of conductivity, ground switch means interposed between said switching branches and said point at ground potential and adapted to selectively open and close the connection of said switching branches to ground; ground switch control means connected between said pair of electrically conductive wires and adapted to control the operation of said ground switch means by a signal in the said electrically conductive wires, a speaker connected between said pair of electrically conductive wires and adapted to convert audio signals in the said electrically conductive wires to sounds, speaker switch means interposed between one of said pair of electrically conductive wires and said speaker and adapted to selectively open and close the connection of said speaker to the said electrically conductive wires, first signal means connected between said electrically conductive wires for indicating the presence of a signal in the said electrically conductive wires, and second signal means interposed between said speaker and said pair of electrically conductive wires for indicating the energized condition of the said speaker.

5. An interrogating system for interrogating selected ones of a plurality of television receivers each adapted to receive and reproduce a plurality of different channels, each of said channels having a frequency different from the others of said channels, each of said receivers radiating a plurality of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximity with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of said indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel received and reproduced by each of the receivers proximate to said selected ones of said identifying means; switchboard means connected to said indicating circuits for selecting and permitting energization of determined ones of said identifying means and for indicating each of the receivers proximate to said selected ones of said identifying means and the channel received and reproduced by each of said last-mentioned receivers; electrically conductive wires connected from said switchboard means to the proximity of each of said receivers; and a line switching unit for each of said plurality of receivers, each said line switching unit comprising four switches connected between said pair of electrically conductive wires and a point at ground potential each adapted to selectively open and close the connection of the wire to which it is connected to ground, and four diodes each interposed between said pair of electrically conductive wires and a corresponding one of said switches, two of said diodes being connected to the corresponding switches in a positive direction of conductivity relative to ground and two of said diodes being connected to the corresponding switches in a negative direction of conductivity relative to ground.

6. An interrogating system for interrogating selected ones of a plurality of television receivers each adapted to receive and reproduce a plurality of different channels, each of said channels having a frequency different from the others of said channels, each of said receivers radiating a plurality of different spurious signals, each of said spurious signals having a frequency different from the others of said spurious signals, the frequency of the spurious signal radiated by a receiver corresponding to the frequency of the channel reproduced by said receiver, said interrogating system comprising, in combination, a plurality of identifying means each positioned in operative proximity with a different one of said receivers for receiving the spurious signals and for identifying the frequency of the spurious signal radiated by the proximate receiver, each of said identifying means comprising a plurality of RF resonant circuits, each of said RF resonant circuits being adapted to resonate at a different frequency of said spurious signals, a plurality of indicating circuits each associated with a different RF resonant circuit, each of said indicating circuits being adapted to indicate energization thereof, and activating means controlled by said RF resonant circuits for permitting the energization of the indicating circuit associated with the RF resonant circuit which is resonating; interrogating means coupled to the indicating circuits of said identifying means for energizing in selected ones of said identifying means the indicating circuit activated by the resonating RF resonant circuit of each of said selected ones of said identifying means to indicate the frequency of the spurious signal received by said selected ones of said identifying means thereby determining the channel received and reproduced by each of the receivers proximate to said selected ones of said identifying means; switchboard means connected to said indicating circuits for selecting and permitting energization of determined ones of said identifying means and for indicating each of the receivers proximate to said selected ones of said identifying means and the channel received and reproduced by each of said last-mentioned receivers; electrically conductive wires connected from said switchboard means to the proximity of each of said receivers; and a line switching unit for each of said plurality of receivers, each said line switching unit comprising four switches connected between said pair of electrically conductive wires and a point at ground potential each adapted to selectively open and close the connection of the wire to which it is connected to ground, four diodes each interposed between said pair of electrically conductive wires and a corresponding one of said switches, two of said diodes being connected to the corresponding switches in a positive direction of conductivity relative to ground and two of said diodes being connected to the corresponding switches in a negative direction of conductivity relative to ground, a ground switch interposed between said switches and said point at ground potential and adapted to selectively open and close the connection of said pair of electrically conductive wires to ground, ground switch control means connected between said pair of electrically conductive wires and adapted to control the operation of said ground switch by a signal in the said electrically conductive wires, said ground switch control means comprising a relay winding, a switch having a short contact time connected in series circuit arrangement with said relay winding, means connecting said series circuit arrangement between said pair of electrically conductive wires, a hold switch and means connecting said hold switch in shunt across said switch having a short contact time, said relay winding being adapted to control the operation of said hold switch and of said ground switch so that upon the closing of said switch having a short contact time said relay is connected between said pair of electrically conductive wires and upon the transmission of a signal in the said pair of electrically conductive wires the said relay is energized and closes said hold switch to maintain its energized condition and controls the position of said ground switch in a predetermined manner, a speaker connected between said pair of electrically conductive wires and adapted to convert audio signals in the said electrically conductive wires to sound, speaker switch means interposed between one of said pair of electrically conductive wires and said speaker and adapted to selectively open and close the connection of said speaker to the said electrically conductive wires, first signal means connected between said electrically conductive wires for indicating the presence of a signal in the said electrically conductive wires, and second signal means interposed between said speaker and said pair of electrically conductive wires for indicating the energized condition of the said speaker.

References Cited in the file of this patent

UNITED STATES PATENTS

| | | |
|---|---|---|
| 2,277,623 | Allen | Mar. 24, 1942 |
| 2,630,367 | Rahmel | Mar. 3, 1953 |
| 2,660,663 | Rahmel | Nov. 24, 1953 |
| 2,820,100 | Abbott | Jan. 14, 1958 |
| 2,901,544 | Collins | Aug. 25, 1959 |